United States Patent
Steck, Jr. et al.

(10) Patent No.: US 12,442,345 B1
(45) Date of Patent: Oct. 14, 2025

(54) SUPPLEMENTAL FUEL CONTROL SYSTEM

(71) Applicant: David William Steck, Jr., Kirkwood, MO (US)

(72) Inventors: David William Steck, Jr., Kirkwood, MO (US); Anthony Jake Merriman, Marana, AZ (US)

(73) Assignee: David Steck, Kirkwood, MO (US)

( * ) Notice: Subject to any disclaimer, the term of this patent is extended or adjusted under 35 U.S.C. 154(b) by 0 days.

(21) Appl. No.: 19/198,369

(22) Filed: May 5, 2025

Related U.S. Application Data (60) Provisional application No. 63/689,490, filed on Aug. 30, 2024.

(51) Int. Cl.
F02D 41/30 (2006.01)

(52) U.S. Cl.
CPC .................... F02D 41/30 (2013.01)

(58) Field of Classification Search
CPC ........................................ F02D 41/30
See application file for complete search history.

(56) References Cited

U.S. PATENT DOCUMENTS

| | | | |
|---|---|---|---|
| 5,924,405 A | 7/1999 | Hashimoto | |
| 6,786,201 B2 | 9/2004 | Ohtani | |
| 7,426,918 B2 | 9/2008 | Brehob et al. | |
| 7,849,842 B1 | 12/2010 | Lewis et al. | |
| 8,412,439 B2 | 4/2013 | Warner et al. | |
| 8,656,890 B2* | 2/2014 | Farah | F02D 41/1401 123/480 |
| 8,688,351 B2* | 4/2014 | Oalen | F02D 41/0097 123/488 |
| 9,885,309 B1 | 2/2018 | Hollar et al. | |
| 10,094,320 B2 | 10/2018 | Sanborn et al. | |
| 10,294,882 B2 | 5/2019 | Sanborn et al. | |
| 10,316,773 B2 | 6/2019 | Sanborn et al. | |
| 10,422,296 B2 | 9/2019 | Hollar et al. | |
| 11,255,279 B2* | 2/2022 | Schiltz | F02D 41/266 |
| 11,371,463 B1 | 6/2022 | Hershorin et al. | |
| 2003/0139872 A1* | 7/2003 | Miki | F02D 19/024 123/406.47 |
| 2003/0187565 A1* | 10/2003 | Wong | F02D 19/105 123/526 |
| 2012/0085322 A1 | 4/2012 | Trzmiel | |
| 2012/0191323 A1* | 7/2012 | Warner | F02D 41/266 701/104 |
| 2014/0116388 A1 | 5/2014 | Foege et al. | |
| 2014/0216414 A1* | 8/2014 | Kawabe | F02D 41/30 123/478 |

(Continued)

*Primary Examiner* — Carl C Staubach
(74) *Attorney, Agent, or Firm* — Carmody MacDonald P.C.; Dennis J M Donahue, III; Kevin C. Staed (57) ABSTRACT

An auxiliary controller operates in combination with a baseline ECU in a primary fuel (PF) system to determine a fueling level for supplemental fuel (SF) injectors. The auxiliary controller receives PF injector on time from the baseline ECU and determines a PF fuel mass and a PF fueled air mass for the primary fuel system. The auxiliary controller calculates a SF fueled air mass from a total engine air mass and the PF fueled air mass and then calculates a SF fuel mass and a SF injector on time. The auxiliary controller sequentially repeats the process for all of the cylinders in the engine and communicates the SF injector on times to the SF injectors for the cylinders.

20 Claims, 4 Drawing Sheets

(56) References Cited

U.S. PATENT DOCUMENTS

| | | | | |
|---|---|---|---|---|
| 2017/0292898 A1* | 10/2017 | Schweikert | ............. | F02D 41/26 |
| 2018/0179982 A1* | 6/2018 | Botting | ................... | F02D 41/34 |
| 2022/0381191 A1* | 12/2022 | Staykov | .............. | F02D 19/0647 |
| 2023/0175454 A1 | 6/2023 | Hershorin et al. | | |

* cited by examiner

SUPPLEMENTAL FUEL CONTROL SYSTEM

CROSS-REFERENCE TO RELATED APPLICATIONS

This application claims priority from U.S. Provisional Patent Application No. 63/689,490 filed Aug. 30, 2024, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to fuel control systems, and more particularly to supplemental fuel control systems that provide additional fuel to an engine beyond the capacity of a primary fuel control system.

Related Art

Direct injected (DI) engines have become common for auto manufacturers to use, but they come with limitations for how much power they can support. DI refers to spraying fuel directly into the cylinder, and port injection (PI) refers to spraying fuel into the intake port of the cylinder head (before the intake valve). Many manufacturers adopted dual injection systems where an engine and its engine control module, i.e., electronic control unit (ECU) supports both. These dual injection systems provide the benefits of both while allowing a large overhead for support of high power output. The ECU constantly measures how much air is moving through the engine, and in dual injection systems, the ECU decides how to split the required fuel delivery between the DI injectors and the PI injectors. This split is dictated by a term called the port factor (or port fraction, or more generally, the supplemental fraction) which represents the percentage of fuel supplied by the supplemental injectors which can be PI injectors or could be a second set of DI injectors. This factor is defined ahead of time, and the ECU uses it to then calculate how long to turn on the DI and PI injectors individually. The basic order of options for a dual injection ECU is summarized below.
Total Fuel Mass & Port Fraction Used to Calculate DI Fuel Mass & PI Fuel Mass Used to Calculate DI Injector on Time & PI Injector on Time DI's limitation has to do with the fact that injectors are spraying directly into the cylinder. A normal engine cycle has four stages: intake, compression, power, and exhaust. These occur over 720° of crankshaft rotation, and each stage lasts approximately 180°. PI injectors can utilize the full 720° worth of crankshaft rotation (with the exception of a forced off time between events) because fuel will collect on the back side of the intake valve, waiting to be ingested at the next intake stroke. DI injectors, as they are inside the cylinder, cannot inject fuel during the power or exhaust strokes, and they really shouldn't inject fuel during the compression stroke which means they are only capable of performing well for roughly 180° worth of crankshaft rotation. This means that the effective flow rate of a DI injector would need to be about four (4) times higher than a PI injector to be able to support the same ceiling of fuel delivery. The problem is large DI injectors lose dynamic operating ability and will not function well at low load/fuel delivery scenarios resulting in poor engine operation.

Aftermarket performance companies have tried to address the shortcomings of DI only systems by adding port injectors to engines that didn't originally have them. Controlling these injectors has historically been poorly managed because the aftermarket auxiliary controllers are trying to interface with sensors on the car but do not interface with the baseline ECU enough to know what is actually happening with the control of the engine, and consequently there are two computers that do not know what the other one is doing. The auxiliary controllers require direct calibration to tell the PI injectors how much fuel to inject, but they cannot adequately compensate for changing operating conditions. The auxiliary controllers rely on a feed forward approach in which the controller is preprogrammed to inject specific amounts of fuel based on a particular state of the engine according to sensor data, such as mass airflow sensor output, speed density, and/or alpha-n (throttle position and engine speed). Other sensor data can include intake manifold pressure, ethanol content, fuel pressure, and more. Speed density refers to calculating air mass using primarily engine speed and manifold pressure in combination with a lookup table. Similarly, alpha-n is a control method in which the fuel level is determined from a lookup table with engine speed and throttle position.

Many rely on an exhaust oxygen sensor (a wideband) to know if the mixture is correct in order to apply a correction. There is never a determination of the port factor because the DI system's contribution is not taken into effect anywhere in the process, and since these auxiliary controllers use a feed forward approach, they typically have a lag in determining the amount of fuel to inject through the PI injectors. The lag is caused by the difference between the current state of the engine and the ECU's latest command for the desired engine operating condition. The current state of the engine is based on a prior commanded engine operating condition so rather than using the current state of the engine to determine the amount of fuel to inject through the PI injectors, it would be beneficial to use the ECU's latest commanded engine operating condition to determine the amount of fuel to inject through the PI injectors.

The problem with these prior art methods is that the actual fuel delivery can vary as operating conditions change, and because these systems are preprogrammed to deliver certain amounts of fuel, they cannot compensate for changes that may occur, especially when those changes are due to variables that are not being not monitored by the auxiliary control system. For example, if the ethanol content of the fuel used changes (and consequently the stoichiometric ratio would necessarily change), the prior art auxiliary control systems cannot automatically compensate for the change and would require reprogramming to compensate based on the change in the ethanol content. Additionally, since these prior art systems do not monitor the true amount of fuel delivered by the primary system in addition to the total air consumed by the engine, they cannot accurately adjust to automatically maintain the correct fueling. Any error has to be made up by corrections from a feedback control loop using a wideband oxygen sensor to compare actual exhaust lambda values versus desired lambda values which is less reliable than knowing the amount of fuel and the air mass being supplied to the engine. Accordingly, it would be beneficial to these real-time calculations regardless of what or how many operating conditions change rather than relying on pre-programmed fuel delivery commands.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
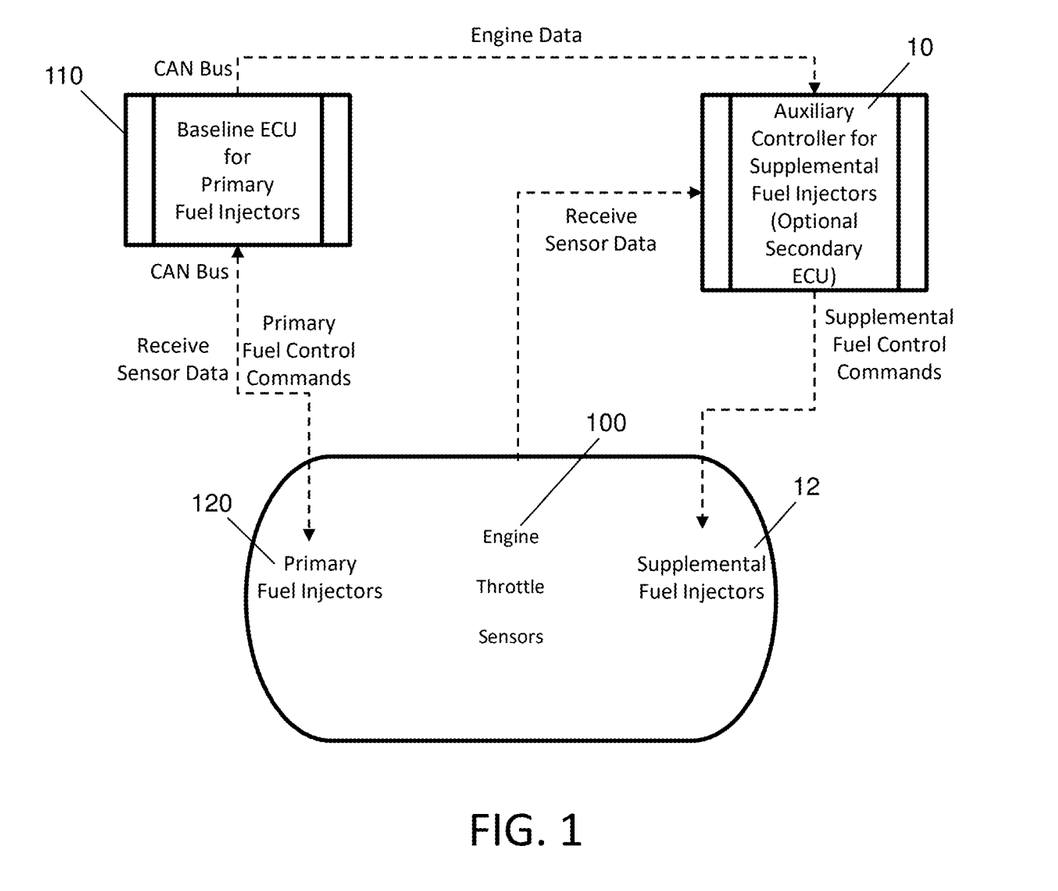
FIG. 1 is a schematic diagram of a supplemental fuel control system with a primary fuel control system.

For engines 100 in which the baseline ECU 110 for the primary fuel system does not dictate the supplemental fraction before calculating the on times for the primary fuel (PF) system's injectors 120 and supplemental fuel (SF) system's injectors 12, the present invention changes the order of operations to make the supplemental fraction a dependent variable rather than an independent variable as in the prior art auxiliary controllers. As shown in FIG. 1, the auxiliary controller 10 receives information from the baseline ECU that the auxiliary controller's computer processor uses to determine the supplemental fraction. There are other parameters used in each step of the process as outlined in the flowcharts shown in FIGS. 2A-2C and as particularly described in the calculations below. The method of the present invention is discussed in terms of mass instead of flow because the process applies to each individual cylinder cycle. As evident from the flowcharts in FIGS. 2A-2C, there are a few different calculations available for the process of the present invention, but all involve starting from the primary fuel system's final contribution and working backwards to determine the fueled and unfueled air masses.

PF Injector on Time (and Other Parameters) Used to Calculate PF Fuel Mass PF Fuel Mass (and Other Parameters) Used to Calculate PF Fueled Air Mass Total Engine Air Mass and PF Fueled Air Mass Used to Calculate SF Fueled Air Mass SF Fueled Air Mass (and Other Parameters) Used to Calculate SF Fuel Mass SF Fuel Mass (and Other Parameters) Used to Calculate SF Injector on Time SF Fuel Mass and PF Fuel Mass Used to Calculate Supplemental Fraction According to the present invention, the primary fuel system's contribution is determined relative to the total air mass of the engine and which is then used to determine an accurate SF fuel mass to supplement the air charge. Using the information from the baseline ECU and feeding it into the calculations with other permanent operational data allows the present method to determine accurate fueling events for all operating conditions with the need to use pre-programmed tables for the operating conditions. The only preprogrammed information supplied to the algorithm is basic information about the SF injectors being used, such as the flow rate of the injectors and offsets that better approximate linear operation. When the algorithm determines that the primary system is not providing enough fuel for the total engine air mass, the SF injectors are automatically activated and deliver the precise amount of fuel that they need for the current conditions. This differs from the traditional approach of retrofit systems because in the present invention, the algorithm reactively decides for itself when and what to do based on the status of the PF system whereas previous retrofit systems are preprogrammed based on sensor outputs without any feedback on the status of the PF system. The new approach of the present invention allows the system to accurately determine the proper amount of fuel required for the SF injectors as operating conditions change. In the previous retrofit systems, when operating conditions differ from the conditions used to produce the preprogrammed tables, the amount of fuel commanded for the SF injectors could be too rich (e.g., fuel pressure is higher than the sensor's maximum reading) or too lean (e.g., fuel pressure has dropped below pressure necessary to meet the commanded fuel level).

Determining the PF fuel mass is the first step of the algorithm, and this is the important part of the process. Some systems may be able to output this value directly, or it can be calculated using the PF injector on time, PF injector flow rate, and characterization values like injector voltage and pressure offsets. Native dual injection systems treat the PF fuel mass as an output, and the key difference for this algorithm is using it as an input which makes the process fundamentally unique. The PF fuel mass is used to calculate the PF fueled air mass based on the stoichiometric ratio of the fuel and the commanded lambda value. From this point, there are multiple ways to proceed with determining the SF fuel mass.

Figure 2A:
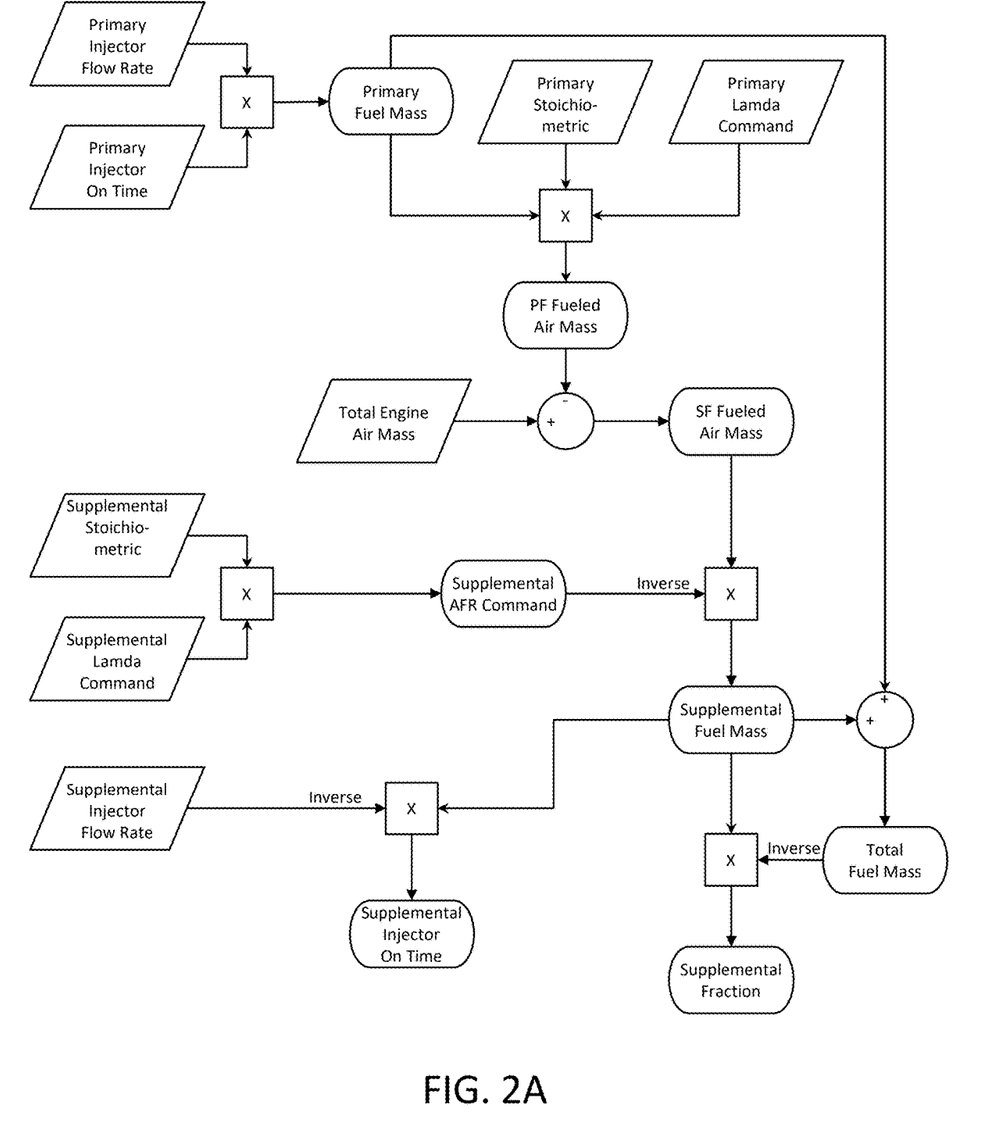
FIGS. 2A-2C are flowcharts of the supplemental fuel control process according to the present invention.

One method, shown in FIG. 2A, is to subtract the PF fueled air mass from the total engine air mass to determine the SF fueled air mass. The algorithm is provided with the stoichiometric value of the SF fuel as well as the commanded lambda value of the SF fueled air mass (Commanded Lambda ($\lambda$)=AFR/Stoichiometric AFR). These values are either pre-programmed or are communicated by the baseline ECU. For example, when in synchronous mode (same fuel for PF and SF), the commanded AFR from the baseline ECU is divided by lambda. When a different supplemental fuel is being used, the stoichiometric value must be entered. Fuel that is injected upstream of the cylinder, i.e., via the port, typically needs a richer mixture (lower lambda value) than fuel that is injected directly into the cylinder, so providing a unique commanded lambda value for a port contribution is important. Multiplying the stoichiometric value by the commanded lambda value results in a commanded air/fuel ratio (AFR) of the SF contribution which in most cases will be a port contribution. Dividing the SF fueled air mass by the SF AFR commanded gives the SF fuel mass which is then used in conjunction with the SF injector flow rate and associated characterization data to determine the SF injector on time. This method allows the algorithm to support a different fuel entirely in the supplemental fuel system versus what the primary fuel system is using (i.e., regular gasoline in the PF system with methanol in the SF system). The final supplemental fraction is calculated by dividing the SF fuel mass by the sum of the SF fuel mass and PF fuel mass. In this method, the supplemental fraction is an output as opposed to being an input.

The equations and corresponding system variables are provided below.

E Engine speed (rpm)
$N_{cyl}$ Number of cylinders
$F_{air}$ Total engine mass airflow (g/s)
$I_{prim}$ Primary injector flow rate (g/s)
$I_{supp}$ Supplemental injector flow rate (g/s)
$A_{total}$ Total engine air mass per cylinder (g)

$A_{prim}$ Air mass fueled by the primary injector (g)
$A_{supp}$ Air mass to be fueled by the supplemental injector (g)
$M_{total}$ Total fuel mass (g)
$M_{prim}$ Primary fuel mass (g)
$M_{supp}$ Supplemental fuel mass (g)
$S_{prim}$ Stoichiometric air/fuel ratio primary fuel
$S_{supp}$ Stoichiometric air/fuel ratio for supplemental fuel
$L_{prim}$ Commanded lambda value of primary air charge
$L_{supp}$ Commanded lambda value of supplemental air charge
$R_{prim}$ Commanded air/fuel ratio for primary air charge
$R_{supp}$ Commanded air/fuel ratio for supplemental air charge
$O_{prim}$ Primary injector total time offset(s)
$O_{supp}$ Supplemental injector total time offset(s)
$T_{prim}$ Primary injector theoretical on time(s)
$T_{prim\ act}$ Primary injector actual on time(s)
$T_{prim\ off}$ Primary injector offset time(s)
$T_{supp}$ Supplemental injector theoretical on time(s)
$T_{supp\ act}$ Supplemental injector actual on time(s)
$T_{supp\ off}$ Supplemental injector offset time(s)
Z Fraction (split factor) of fuel provided by supplemental fuel injector The theoretical injector on time for the primary and supplemental injectors is used in the fuel mass calculations (theoretical injector on time is the time used if the injector were an ideal device, and the offset value is used as a correction for the actual delivered pulse to make it act ideal).

$$T_{prim} = T_{prim\ act} - T_{prim\ off}$$
$$T_{supp} = T_{supp\ act} - T_{supp\ off}$$

The commanded air/fuel ratio for primary and supplemental charges are defined.

$$R_{prim} = S_{prim} \cdot L_{prim}$$
$$R_{supp} = S_{supp} \cdot L_{supp}$$

The primary fuel system's delivered fuel mass is preferably calculated before calculating the air mass fueled by the primary system.

$$M_{prim} = I_{prim} \cdot T_{prim}$$
$$A_{prim} = M_{prim} \cdot R_{prim}$$

The total engine mass airflow is converted to the total engine air mass per cylinder, and once the primary fuel mass is known, calculate the remaining air mass to be fueled by the supplemental injector. This is then used to calculate the supplemental fuel mass required.

$$A_{total} = \frac{F_{air} \cdot 120}{N_{cyl} \cdot E}$$
$$A_{supp} = A_{total} - A_{prim}$$
$$M_{supp} = \frac{A_{supp}}{R_{supp}}$$

The total fuel mass is now known, and the resultant supplemental fraction can be calculated.

$$M_{total} = M_{prim} + M_{supp}$$
$$Z = \frac{M_{supp}}{M_{total}}$$

The final step is to calculate the delivered on time to the supplemental injector.

$$T_{supp\ act} = \frac{M_{supp}}{I_{supp}} + T_{supp\ off}$$

Figure 2B:
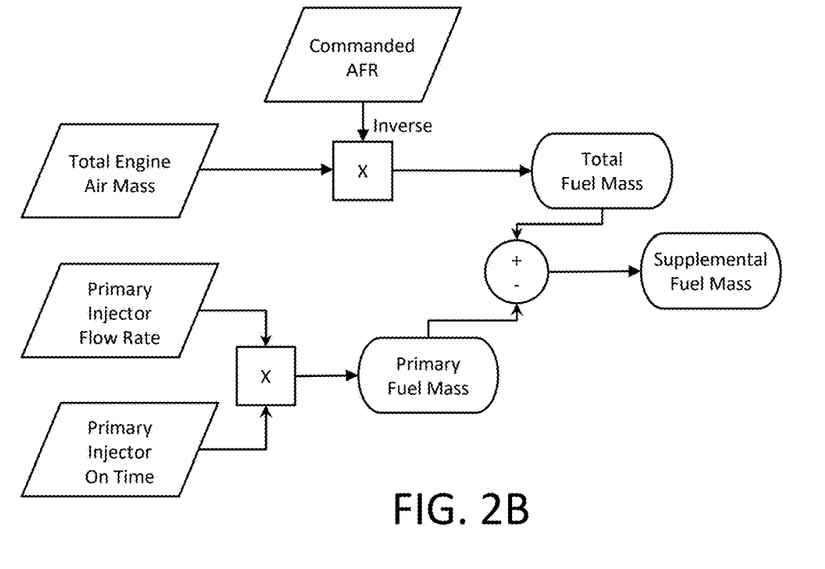

Another method, shown in FIG. 2B, involves taking the total engine air mass and using a predetermined total commanded air/fuel ratio along with the PF fuel mass to determine the SF fuel mass. It will be appreciated that the commanded air/fuel ratio could be provided by the baseline ECU or could be calculated in the auxiliary controller by multiplying the stoichiometric value by the commanded lambda value when these values are provided. The total engine air mass divided by the total commanded air/fuel ratio gives the total fuel mass. Subtracting the PF fuel mass from the total fuel mass then gives the SF fuel mass, subsequently allowing a determination of the SF injector on time. This method can be used for synchronous fueling operations.

Figure 2C:
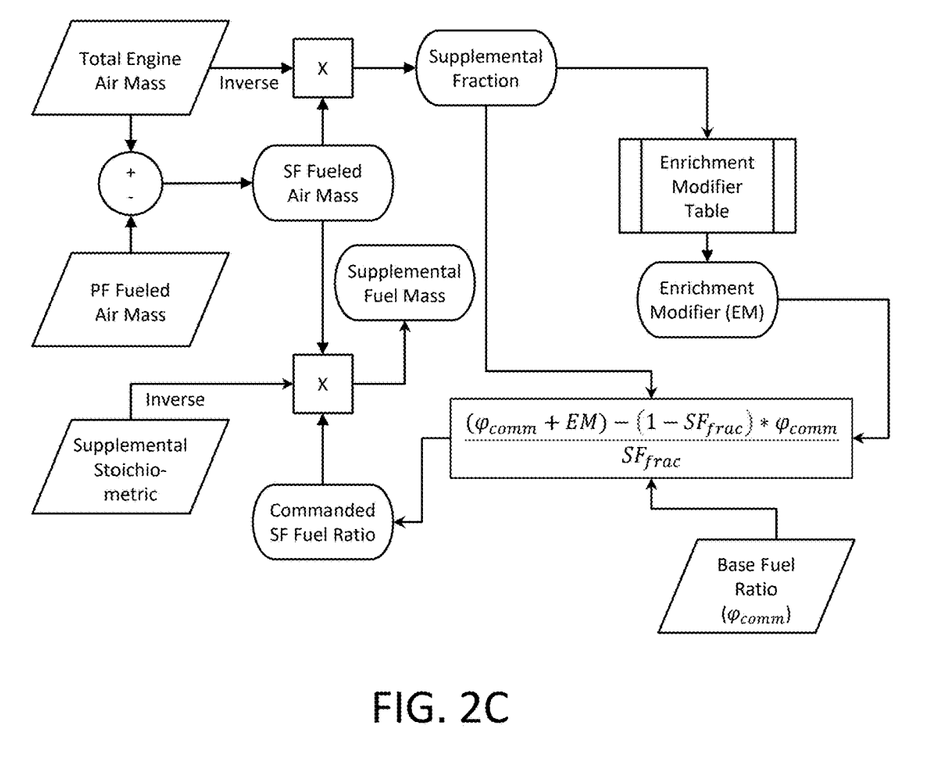

Another method, shown in FIG. 2C, is similar to the method described above with reference to FIG. 2A but is more flexible because it allows for adjusting the overall lambda ratio based on the split of fueling. According to this method, an air mass factor (or fraction) is used to dictate a modifier value for the commanded lambda (and consequently commanded air/fuel ratio) when the PF fuel is supplied with direct injection while the SF fuel is supplied with port injection. Subtracting the PF fueled air mass from the total engine air mass results in the SF fueled air mass. The SF fueled air mass divided by the total engine air mass results in a SF air mass factor that represents 0% to 100% SF fueling, i.e., SF fraction between 0 and 1. At 0%, there would be no modifier to the commanded lambda value, but as the contribution from the SF system increases, there would be a need to enrich the fuel mixture relative to the base ratio that is commanded. The modifier can be obtained from a lookup table of enrichment modifiers that span the entire range of the SF fraction. Although the system will not get to 100% SF fueling, this highest value for SF fueling is used for interpolation. Using this modifier along with the stoichiometric value of the SF fuel and the base commanded lambda will provide a SF fuel mass. It will be appreciated that the SF fuel mass combined with the PF fuel mass results in the total fuel mass required. Subtracting the PF fuel mass from this updated total fuel mass will give the SF fuel mass needed, and consequently allowing a calculation of the SF injector on time.

A representative enrichment table is shown below for an engine in which the primary fuel is delivered with direct injectors and the supplemental fuel is delivered with port injectors. It will be appreciated that if the SF fuel is different from the PF fuel, the values in the table will be different from the table that is used for synchronous fueling operations. The table uses enrichment modifiers ($E_{mod}$) for an equivalence ratio, phi ($\varphi$), relative to the SF fraction ($SF_{frac}$):

the value of phi ($\varphi$) is the inverse of lambda ($\lambda$). It will be appreciated that the enrichment table could use lambda values, but the modifiers would be negative numbers because a richer AFR results in a smaller lambda number whereas a richer AFR in equivalence ratio units results in a larger lambda phi number. When determining the charge required for the SF fuel mass, the enrichment modifier is added to the inverse of the base commanded lambda, i.e., added to the base commanded equivalence ratio ($\varphi_{comm}$), to determine the total target ratio (TTR). The commanded fuel ratio for only the supplemental charge ($\varphi_{supp}$) is then determined by the equation as provided below. With phi as the commanded fuel ratio for the supplemental charge, the SF fuel mass can be calculated as the product of SF fueled air mass with the commanded phi divided by the stoichiometric value for the supplemental fuel ($S_{supp}$), i.e., SF fuel mass= (SF fueled air mass*$\varphi_{supp}$)/$S_{supp}$.

| $SF_{frac}$ | 0.000 | 0.125 | 0.250 | 0.375 | 0.500 | 0.625 | 0.750 | 0.875 | 1.000 |
|---|---|---|---|---|---|---|---|---|---|
| $E_{mod}$ | 0.0000 | 0.0125 | 0.0250 | 0.0375 | 0.0500 | 0.0625 | 0.0750 | 0.0875 | 0.1000 |

$$TTR = \varphi_{comm} + E_{mod}$$

$$\varphi_{supp} = \frac{TTR - (1 - SF_{frac}) * \varphi_{comm}}{SF_{frac}}$$

In an example in which the commanded equivalence ratio is 1.175 and the SF fraction is 0.6, the commanded phi for the supplemental charge would be 1.275. This result for the supplemental charge is obtained by first interpolating the table to obtain the enrichment modifier of 0.06, and adding this modifier to the commanded equivalence ratio to determine the total target ratio (1.175+0.06=1.235). Entering the numbers into the equation above for the supplemental fuel's commanded phi results in 1.275, i.e., (1.235−(1−0.6)*(1.175))/0.6.

Each one of the methods described above automates the process for determining the SF injector on time without needing to dictate fuel mass values based on operating conditions ahead of time. The present invention uses basic information for the engine's operating conditions as well as injector information, allowing the primary fuel system to reach the maximum capacity of the PF injectors at which point the supplemental fuel system provides additional fuel through the SF injectors. The result is a more robust fuel delivery control system that requires no calibration by the end user when used in a system with already known good air and fuel system modeling. It is preferred that the engine data used to determine the SF injector on time is received from the baseline ECU over the controller area network (CAN) bus, such as the primary injector flow rate, the primary injector on time, the primary stoichiometric value, the primary lambda command, and the total engine air mass. This data could include a signal which indicates when the PF injector for each cylinder in the engine has reached its maximum fueling capacity based on a user configured calibratable value. If the data from the baseline ECU is not available over the CAN, it will also be appreciated that a secondary ECU could receive the sensor data and perform similar calculations as the baseline ECU in order to substantially mirror the baseline ECU and provide the engine data to the auxiliary controller. The secondary ECU could be a part of the auxiliary controller and would preferably only be mirroring the baseline ECU and would not replace the baseline ECU or send any control signals to the PF injectors. The secondary ECU could be a separate, third-party device that is in communication with the auxiliary controller.

When the SF injector on time is determined by the auxiliary controller by any of the methods described above, the auxiliary controller uses this value to directly drive the SF injectors. It will be appreciated that the process for determining the SF injector on time is repeated for each cylinder in the engine, and the SF injector on time is sequentially communicated to the SF injectors for the corresponding cylinders. When the primary fuel and the supplemental fuel are the same type of fuel, the same fuel tank can be fluidly connected to the PF injectors and the SF injectors. In the case where the supplemental fuel is different from the primary fuel, the supplemental fuel would have its own fuel tank. In either case, the SF injectors supply the supplemental fuel corresponding to the SF injector on time.

The present invention can also incorporate offsets into the equations (sometimes referred to as deadtimes) which identify a period of time at the beginning of a pulse where fuel is not actually being delivered yet. Injector manufacturers characterize this data, and there are actually a number of modifiers used by various manufacturers to take a theoretical pulsewidth and turn it into an actual delivered pulsewidth. The theoretical pulsewidth is simple: requested fuel mass divided by injector flow rate. As an example, a 0.1 g requested fuel mass from a 5 g/s injector would be 20 ms worth of on time for an injector that operated ideally and linearly. In operation, injectors are not ideal devices, and factors such as supply voltage, differential pressure across the injector outlet, temperature, and potentially more can impact this. Some manufacturers use "short pulse adder" as an additional modifier for extremely short pulses because the operation is not linear in these conditions (after the short pulse period, the output becomes linear with more on time). Other manufacturers linearize the short pulse region and then define a high and low slope to the fuel injector. Some manufacturers don't even bother with any short pulse correction. Voltage for direct injectors is not usually a factor because the injector drivers operate at fixed voltage, but traditional port injectors are subject to the driver voltage which is typically just the input voltage of the system (varies from 10-15V).

The flow rate may also have a similar correction. Injectors tend to follow Bernoulli's principle where flow rate scales based (closely) on the square root of the pressure across the outlet. Manufacturers may use correlations that they use for modifiers to the injector flow rate, such as ethanol content, temperature, or other parameters. The correlations become multipliers that modify the base injector flow rate into a corrected injector flow rate. The baseline ECU uses fuel mass and flow rate to find on time for the fuel delivery. The present invention backs out this information (Theoretical Primary Injector On Time. Corrected Primary Injector Flow Rate=Primary Fuel Mass).

The following example is a situation in which the present invention is an improvement over prior art auxiliary control systems. For some control systems, the earliest start of injection (SOI) and the latest end of injection (EOI) can be specified in terms of crankshaft position. It is possible to have a SOI and EOI that result in a total available injector on time that is shorter than is actually required given the current operating conditions. For example, a SOI of 340° and EOI of 196° is 144° worth of crankshaft rotation. At 6000 rpm, 144° equates to 4 ms of time to fire the injector. This may be enough time when all components are functioning ideally, but if fuel pressure drops, the actual required on time may end up longer than what is actually allowed. In this scenario, it is possible that the delivered amount of fuel would be significantly lower than what is required. Current auxiliary controllers would not be able to know that the primary fuel system is not currently delivering all of its expected fuel, and because they are pre-programmed to deliver fuel based on tables produced with the optimal fuel pressure, and they will not be capable of making up the difference when the fuel pressure has dropped. According to the present invention, the auxiliary controller would automatically compensate by adding more fuel through the SF injectors because it is tracking the total airflow as well as the primary fuel system's actual delivered fuel, not just the theoretical or ideal amount of fuel that is expected from the primary fuel system. In the present invention, the SF injectors are not activated until there is a differential between the total engine air mass and the primary fueled air mass. Once there is a differential, the auxiliary controller performs the calculations above to determine the SF injector on time.

Figure 3:
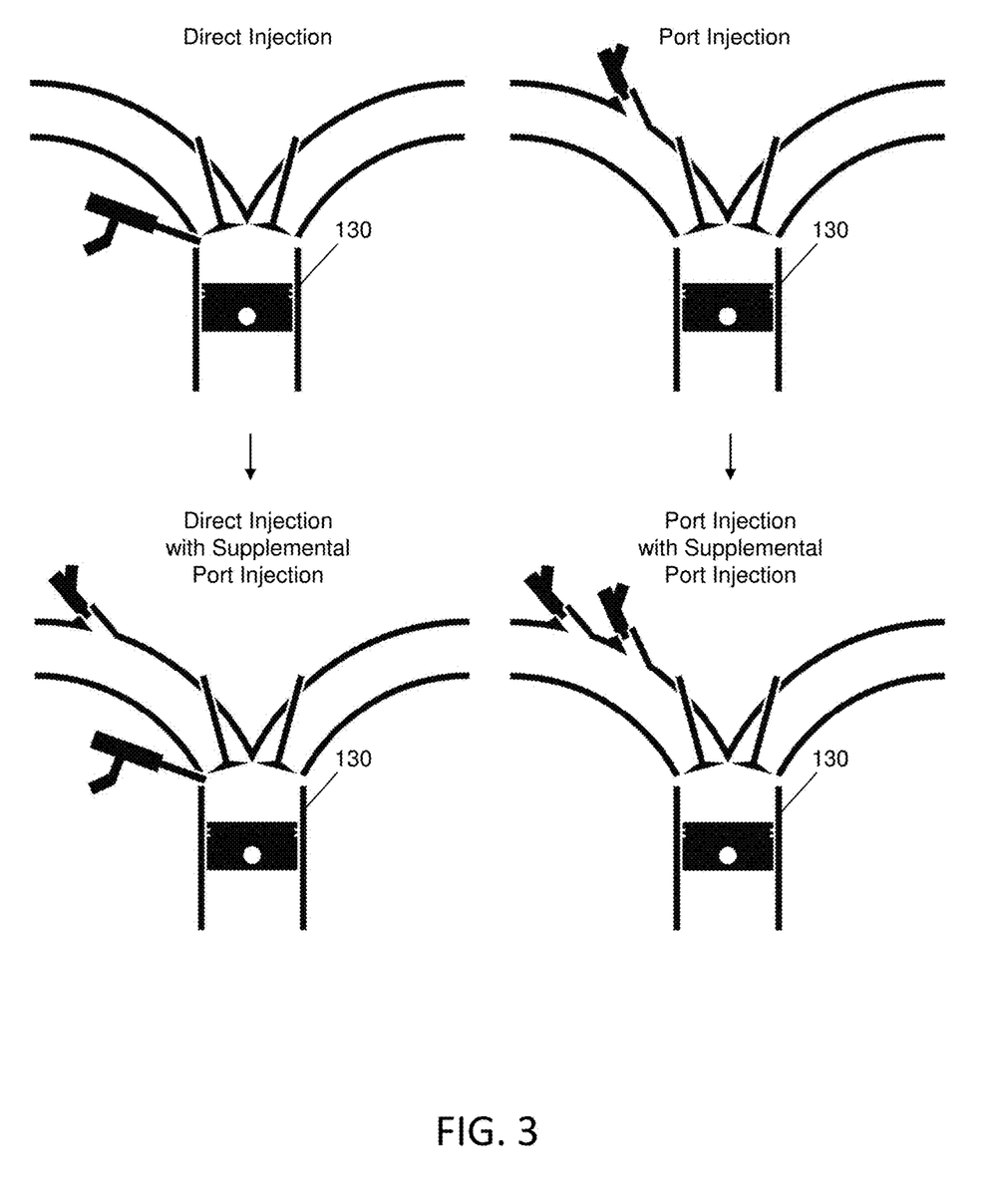
FIG. 3 are diagrams of primary fuel injectors as modified with supplemental fuel injectors.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, as shown in FIG. 3, the present invention can be implemented with engines in which the primary fuel system uses direct injection as well as engines in which the primary fuel system uses port injection. In most cases, the supplemental fuel system uses port injection because this implementation of the invention will not require physically modifying the cylinder head 130 and/or the combustion chamber. It will be appreciated that the present invention could be applied to a supplemental fuel system that uses direct injection. Thus, the breadth and scope of the present invention should not be limited by any of the above-described exemplary embodiments, but should be defined only in accordance with the following claims appended hereto and their equivalents.

What is claimed is:

1. A method for using information from a primary fuel system for an engine with a baseline ECU and a plurality of PF injectors for a corresponding set of cylinders to determine a supplemental fueling level for a plurality of SF injectors in the engine, wherein the SF injectors have a SF injector flow rate, comprising:
   providing an auxiliary controller in operative communication with the baseline ECU and the SF injectors;
   receiving or calculating in the auxiliary controller at least one of a PF fueled air mass and a PF fuel mass;
   receiving in the auxiliary controller a total engine air mass from the baseline ECU and an additional set of data from the baseline ECU;
   calculating in the auxiliary controller a SF fuel mass from the total engine air mass, at least one of the PF fueled air mass and the PF fuel mass, and the additional set of data;
   calculating in the auxiliary controller a SF injector on time from the SF fuel mass and the SF injector flow rate for the SF injectors; and
   communicating the SF injector on time from the auxiliary controller to at least one of the SF injectors.

2. The method of claim 1, further comprising the steps of:
   repeating the receiving steps, the calculating steps and the communicating step for each of the cylinders in the engine; and
   sequentially communicating the SF injector on time from the auxiliary controller to each one the SF injectors for the corresponding cylinders in the engine.

3. The method of claim 2, further comprising the steps of:
   providing a supplemental fuel in fluid communication with the SF injector; and
   delivering to the engine a portion of the supplemental fuel corresponding to the SF injector on time for each one of the SF injectors receiving the SF injector on time.

4. The method of claim 1, further comprising the steps of:
   receiving in the auxiliary controller from the baseline ECU a PF injector on time and a PF injector flow rate; and
   determining in the auxiliary controller a PF fuel mass according to the PF injector on time and the PF injector flow rate.

5. The method of claim 1, further comprising the step of calculating in the auxiliary controller the SF fueled air mass from the total engine air mass and the PF fueled air mass, wherein the PF fueled air mass is received in the auxiliary controller in the additional set of data from the baseline ECU.

6. The method of claim 5, further comprising the steps of:
   providing a table of enrichment modifiers over a range of air mass fractions, wherein the air mass fractions are ratios of SF fueled air mass levels relative to the total engine air mass;
   calculating in the auxiliary controller a SF air mass fraction based on the total engine air mass and the SF fueled air mass;
   determining in the auxiliary controller an enrichment modifier from the table of enrichment modifiers according to the calculated supplemental air mass fraction; and
   calculating in the auxiliary controller a commanded supplemental fuel ratio based on a commanded fuel ratio for the total engine air mass, the enrichment modifier, and the calculated air mass fraction, wherein the commanded fuel ratio is in the additional set of data.

7. The method of claim 6, wherein the step for calculating the SF fuel mass is based on a stoichiometric value for the supplemental fuel received with the additional set of data, the commanded supplemental fuel ratio, and the SF fueled air mass.

8. The method of claim 1, further comprising the step of repeating the receiving steps when a max capacity signal has not been received for the cylinders, wherein the max capacity signal is received in the auxiliary controller in the additional set of data from the baseline ECU.

9. The method of claim 1, further comprising the steps of:
   determining in the auxiliary controller whether the total engine air mass is greater than the PF fueled air mass;
   performing the calculating steps and the communicating steps when the total engine air mass is greater than the PF fueled air mass; and
   repeating the receiving steps when the total engine air mass is not greater than the PF fueled air mass.

10. The method of claim 1, further comprising the steps of:
calculating in the auxiliary controller a total fuel mass from the total engine mass and a commanded air/fuel ratio, wherein the commanded air/fuel ratio is received with the additional set of data; and
subtracting the primary fuel mass from the total engine air mass to get the supplemental fuel mass.

11. A method for using information from a primary fuel system for an engine with a baseline ECU and a plurality of primary fuel injectors for a corresponding set of cylinders to determine a supplemental fueling level for a plurality of SF injectors in the engine, wherein the SF injectors have a SF injector flow rate, comprising:
providing an auxiliary controller in operative communication with the baseline ECU and the SF injectors;
providing a table of enrichment modifiers over a range of air mass fractions, wherein the air mass fractions are ratios of SF fueled air mass levels relative to total engine air mass;
receiving or calculating in the auxiliary controller a PF fueled air mass;
receiving in the auxiliary controller a total engine air mass, a commanded fuel ratio for the total engine air mass, and a stoichiometric value for the supplemental fuel from the baseline ECU;
calculating in the auxiliary controller a SF fueled air mass from the total engine air mass and the PF fueled air mass;
calculating in the auxiliary controller a SF air mass fraction based on the total engine air mass and the SF fueled air mass;
determining in the auxiliary controller an enrichment modifier from the table of enrichment modifiers according to the calculated SF air mass fraction;
calculating in the auxiliary controller a commanded supplemental fuel ratio based on the commanded fuel ratio for the total engine air mass, the enrichment modifier, and the calculated SF air mass fraction;
calculating in the auxiliary controller a SF fuel mass from the stoichiometric value for the supplemental fuel, the commanded supplemental fuel ratio, and the SF fueled air mass;
calculating in the auxiliary controller a SF injector on time from the SF fuel mass and the SF injector flow rate for the SF injectors; and
communicating the SF injector on time from the auxiliary controller to at least one of the SF injectors.

12. The method of claim 11, further comprising the steps of:
repeating the receiving steps, the calculating steps and the communicating step for each of the cylinders in the engine; and
sequentially communicating the SF injector on time from the auxiliary controller to each one the SF injectors for the corresponding cylinders in the engine.

13. The method of claim 12, further comprising the steps of:
providing a supplemental fuel in fluid communication with the SF injector; and
delivering to the engine a portion of the supplemental fuel corresponding to the SF injector on time for each one of the SF injectors receiving the SF injector on time.

14. The method of claim 11, further comprising the steps of:
receiving in the auxiliary controller from the baseline ECU a PF injector on time and a PF injector flow rate;

determining in the auxiliary controller a PF fuel mass according to the PF injector on time and the PF injector flow rate.

15. The method of claim 11, further comprising the step of repeating the receiving steps when a max capacity signal has not been received for the cylinders, wherein the max capacity signal is received in the auxiliary controller in the additional set of data from the baseline ECU.

16. A method for using information from a primary fuel system for an engine with a baseline ECU and a plurality of primary fuel injectors for a corresponding set of cylinders to determine a supplemental fueling level for a plurality of SF injectors in the engine, wherein the SF injectors have a SF injector flow rate, comprising:
providing an auxiliary controller in operative communication with the baseline ECU and the SF injectors;
receiving or calculating in the auxiliary controller at least one of a PF fueled air mass and a PF fuel mass;
receiving in the auxiliary controller a total engine air mass from the baseline ECU and an additional set of data from the baseline ECU;
calculating in the auxiliary controller a SF fueled air mass from the total engine air mass and the PF fueled air mass;
calculating in the auxiliary controller a SF fuel mass from the SF fueled air mass and a commanded fuel ratio;
calculating in the auxiliary controller a SF injector on time from the SF fuel mass and the SF injector flow rate; and
communicating the SF injector on time from the auxiliary controller to at least one of the SF injectors.

17. The method of claim 16, further comprising the steps of:
providing a table of enrichment modifiers over a range of air mass fractions, wherein the air mass fractions are ratios of SF fueled air mass levels relative to total engine air mass;
receiving in the auxiliary controller the commanded fuel ratio for the total engine air mass and a stoichiometric value for the supplemental fuel;
calculating in the auxiliary controller a SF air mass fraction based on the total engine air mass and the SF fueled air mass; and
calculating in the auxiliary controller a commanded supplemental fuel ratio based on the commanded fuel ratio for the total engine air mass, the enrichment modifier, and the calculated SF air mass fraction.

18. The method of claim 16, further comprising the steps of:
repeating the receiving steps, the calculating steps and the communicating step for each of the cylinders in the engine; and
sequentially communicating the SF injector on time from the auxiliary controller to each one the SF injectors for the corresponding cylinders in the engine.

19. The method of claim 18, further comprising the steps of:
providing a supplemental fuel in fluid communication with the SF injector; and
delivering to the engine a portion of the supplemental fuel corresponding to the SF injector on time for each one of the SF injectors receiving the SF injector on time.

20. The method of claim 16, further comprising the steps of:
receiving in the auxiliary controller from the baseline ECU a PF injector on time and a PF injector flow rate; and determining in the auxiliary controller a PF fuel mass according to the PF injector on time and the PF injector flow rate.

\* \* \* \* \*